S. HOLTON, Jr.
Thermometer.
No. 20,348.
Patented May 25, 1858.
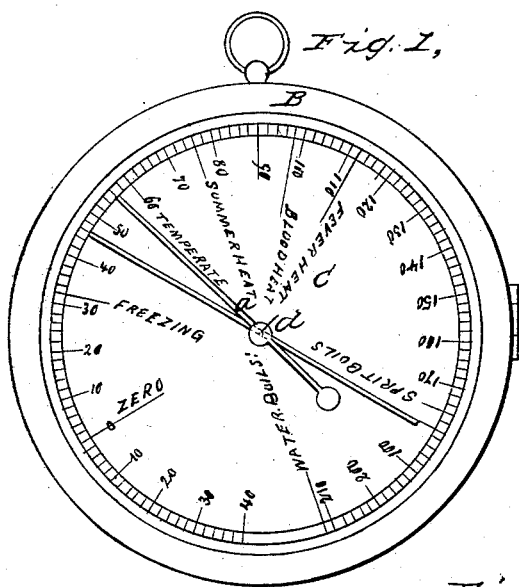
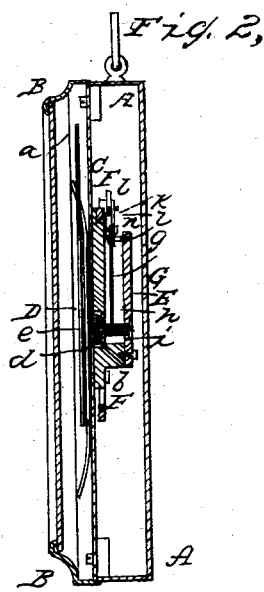
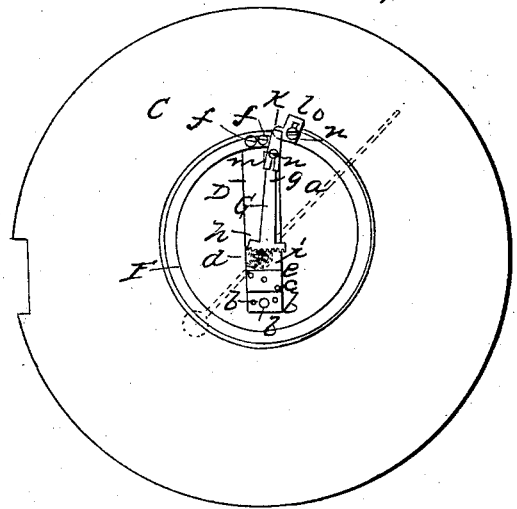

UNITED STATES PATENT OFFICE.

S. HOLTON, JR., OF MIDDLEBURY, VERMONT.

THERMOSTAT.

Specification of Letters Patent No. 20,348, dated May 25, 1858.

*To all whom it may concern:*

Be it known that I, SIMEON HOLTON, Jr., of Middlebury, in the county of Addison and State of Vermont, have invented a new and useful Improvement in Metallic Thermometers; and I do hereby declare that the following is a full, clear, and exact description of the same, reference being had to the annexed drawings, making a part of this specification, in which—

Figure 1, is a face view of a metallic thermometer with my improvement, complete. Fig. 2, is a central section of the same. Fig. 3, is a back view of the same removed from the case, and having the back bracket which contains one of the bearings of the pointer spindle removed.

Similar letters of reference indicate corresponding parts in all the figures.

This invention consists in certain means of adjustment whereby the pointer is made to indicate correctly upon the dial the variations of temperature.

To enable others to make and use my invention, I will proceed to describe its construction and operation.

A B is the case of the instrument, consisting of a circular box A, of metal, or other material, with a hinged front B, consisting of a metal frame containing a glass through which the dial is visible.

C, is a circular plate attached by screws to the box B, and having the working parts of the thermometer attached. The face of this plate is engraved to constitute the dial on which the temperature is indicated by the pointer $a$.

D is a stout plate secured by screws $b$, $b$, to the back of the dial plate C; and E is a bracket secured by a screw $c$, to the plate D.

$d$, is the spindle which carries the pointer $a$, working in bearings in plate D, and bracket E. The spindle $d$, has applied to it a hair spring $e$, one end of which is attached to the plate D, said spring being for the purpose of preventing the shaking of the pointer if the gearing of the pinion $i$, and arc $h$, has any room for play.

F, is the compound bar, composed of laminæ of brass and steel, or other metals having different degrees of expansibility by heat, curved so as to form very nearly a ring and attached at one end to the plate D, by screws $f$, $f$.

G, is a lever attached to a fulcrum spindle $g$, which is fitted to bearings in the plate D, and bracket E. This lever has formed at the end of its longer arm a toothed arc $h$, which gears with a pinion $i$, on the pointer spindle; and its shorter arm has rigidly attached to it a plate $j$, which forms a continuation of said arm, and which has a notch at its end to receive a pin $k$, which is secured in a plate $l$, that is attached rigidly to the free end of the compound bar F.

The expansion and contraction of the compound bar F, by differences of temperature causes the pin $k$, to move the lever G, whose toothed arc $h$, acts upon the pinion $i$, to turn the pointer $a$, which is thus caused to indicate the temperature upon the dial.

The plates $j$, and $l$, constitute the means of adjustment whereby the movement of the pointer is made to indicate correctly the temperature. To permit the requisite adjustment, the plate $j$, has a slot $m$, formed in it (as shown in Fig. 3) to receive a screw $n$, which screws into the lever G, and screws said plate thereto; and the plate $l$, has a slot $o$, formed in it to receive a screw $p$, which screws into the compound bar and attaches the said plate thereto. The adjustment is effected by slackening the screws $n$, and $p$, and shifting the plates $j$, and $l$, nearer to or farther from the pointer spindle $a$, and thus shortening or lengthening the effective length of that arm of lever G, which is farthest from the pinion shaft, both plates being moved a corresponding distance to preserve the proper relation of pin $k$, in the notch of the plate $j$. The movement of the pointer, it is obvious, is diminished relatively to the expansion and contraction of the bar F, by adjusting the plates $j$, and $l$, toward the pointer spindle, and increased by the reverse adjustment.

$q$, $q$, are a pair of registering pointers, fitted loosely to the pointer-spindle $d$, and operated by the pointer $a$, to register the highest or lowest temperature which is indicated.

I claim no part of the instrument, but the means of adjusting the movement of the pointer relatively to the expansion and contraction of the compound bar. But

What I claim as my invention, and desire to secure by Letters Patent, is:—

The slotted plates $l$, and $j$, carrying the pin $k$, and the notch in which it works, applied to the compound bar and to the lever G, substantially as described, to vary the effective length of one arm of said lever and yet preserve its proper relation to the compound bar, and operating as set forth.

SIMEON HOLTON, JUNIOR.

Witnesses:
NATHANIEL HARRIS,
W. P. RUSSEL.